US010191860B2

(12) United States Patent
Saldanha et al.

(10) Patent No.: US 10,191,860 B2
(45) Date of Patent: Jan. 29, 2019

(54) SECURING SENSITIVE HISTORIAN CONFIGURATION INFORMATION

(71) Applicant: Invensys Systems, Inc., Foxboro, MA (US)

(72) Inventors: Ryan B. Saldanha, Anaheim, CA (US); Vinay T. Kamath, Rancho Santa Margarita, CA (US); Peijen Lin, Irvine, CA (US); Abhijit Manushree, Laguna Niguel, CA (US)

(73) Assignee: Schneider Electric Software, LLC, Lake Forest, CA (US)

( * ) Notice: Subject to any disclaimer, the term of this patent is extended or adjusted under 35 U.S.C. 154(b) by 42 days.

(21) Appl. No.: 14/638,506

(22) Filed: Mar. 4, 2015

(65) Prior Publication Data

US 2016/0259737 A1 Sep. 8, 2016

(51) Int. Cl.
*G06F 12/14* (2006.01)
*H04L 29/06* (2006.01)

(52) U.S. Cl.
CPC ...... *G06F 12/1475* (2013.01); *H04L 63/0823* (2013.01); *G06F 2212/1052* (2013.01)

(58) Field of Classification Search
CPC ......... G06F 12/1475; G06F 2212/1052; H04L 63/0823
See application file for complete search history.

(56) References Cited

U.S. PATENT DOCUMENTS 5,918,228 A * 6/1999 Rich ....................... G06F 21/41
6,754,885 B1 * 6/2004 Dardinski .............. G05B 15/02 717/113
7,519,776 B2 * 4/2009 Naryzhny ............. G06F 12/127 711/100
8,479,008 B2 * 7/2013 Lin ....................... H04L 9/3247 713/178
9,143,563 B2 * 9/2015 Pingel .................... G06F 3/0604
2005/0138367 A1 * 6/2005 Paganetti ............ H04L 63/0823 713/161
2009/0198648 A1 * 8/2009 Middleton ........ G06F 17/30398
2010/0131949 A1 * 5/2010 Ferris .................... G06F 9/5027 718/1

(Continued)

OTHER PUBLICATIONS

J. He and M. Wang, "Cryptography and relational database management systems," Proceedings 2001 International Database Engineering and Applications Symposium, Grenoble, 2001, pp. 273-284. doi: 10.1109/IDEAS.2001.938095.*

(Continued)

*Primary Examiner* — Ramon A. Mercado

(74) *Attorney, Agent, or Firm* — Stinson Leonard Street LLP

(57) ABSTRACT

Systems and methods for securing configuration information for cloud-based services. A system comprises a data store and data sets including plant process information and configuration information. A memory device stores computer-executable instructions. When executed by a processor coupled to the cloud service, the instructions receive configuration information, store it in a data file, apply a generated certificate to the file, and deploy the resulting protected configuration data file to the cloud-based service. In addition, the protected configuration data file is made available by obtaining the file from the cloud-based service.

13 Claims, 6 Drawing Sheets

(56) References Cited

U.S. PATENT DOCUMENTS

| | | | | |
|---|---|---|---|---|
| 2010/0318740 | A1* | 12/2010 | Guerrasio | G06F 12/126 711/118 |
| 2011/0282866 | A1* | 11/2011 | Erickson | G06F 17/30516 707/722 |
| 2012/0159178 | A1* | 6/2012 | Lin | H04L 9/3247 713/178 |
| 2013/0124465 | A1* | 5/2013 | Pingel | G06F 3/0604 707/610 |

OTHER PUBLICATIONS

Public-key cryptography, Wikipedia, Dec. 2014, https://en.wikipedia.org/wiki/Publickey_cryptography.*
Public-key cryptography, Wikipedia, Feb. 2015.*

* cited by examiner

SECURING SENSITIVE HISTORIAN CONFIGURATION INFORMATION

BACKGROUND

Cloud-based computer system providers allow for certain resources to be accessed by computing devices over a network. Data storage is one example of such a resource provided for access by cloud-based computer systems. Cloud-based applications are another example of such a resource; the applications may be deployed and managed using networked computer systems to access data stored in a cloud-based data store.

Users are provided with various levels of access to the above-described resources. The various levels of access facilitate resource management and also provide resource security. For example, certain users are merely authorized to manage the deployment of a cloud-based application to a network, while other users are authorized to manage the application itself. However, if an excessive number of users authorized to manage deployment are granted authorization to manage the application itself, security of the stored data as well as security of the application is more likely to be compromised.

Another example of the need to provide resource security is evident in the recognition that the stored data managed by the cloud-based computer system comprises a series of physical hard drives. In the event the physical hard drive is stolen, or a hacker gains access to the hard drives through an authorized local network or by other means, sensitive configuration information on the hard drive is more likely to be compromised. More specifically, the physical hard drive contains certain resource-related data used to configure a cloud-based application. This configuration data is also capable of being used to locate and access the stored data, and is typically output in an unencrypted form as plain text into a log when the application reads the configuration data during the configuration process. Allowing users that are authorized to manage deployment to see the logs containing the configuration data also degrades the security of the stored data.

Current providers of cloud-based computer systems employ traditional methods of securing data transmitted by the networked system, such as by restricting access to certain resources based on whether the user is authorized to access the resource itself. Current providers also protect communications by uploading certificates in order to protect a runtime upload channel and/or by monitoring the channel in order to detect whether networked communications have been intercepted, such as during a "Man-in-the-Middle" attack. Each of these methods may protect access to cloud-based resources in some manner, but they do not adequately protect certain resource-related data used to configure the application, or address concerns related to protecting data output to logs in the manner described above.

SUMMARY

Briefly, aspects of the present invention relate to the systems and methods for enabling the secure deployment of cloud-based services. By securing sensitive configuration information used to configure cloud-based services through encryption or other means, fewer unauthorized users are able to access information that, if made available, would increase the possibility of compromising the cloud-based services. To this end, aspects of the present invention prevent unauthorized access to this data by making the configuration information available to the cloud-based service through the use of a protected configuration data file. In this manner, the configuration information is functionally accessible by the cloud-based service, yet the information itself is only viewable by authorized users, thus increasing the security of the cloud-based services.

In an aspect, a system comprises a cloud-based data store with at least one data set storing time series data representing plant process information and at least another of the data sets storing information used to configure the cloud services associated with the data store. The system further includes at least one processor coupled to the cloud service via a communication network and at least one memory device coupled to the processor storing computer-executable instructions that execute a method for securely providing configuration information to the cloud service. The method executed by the computer-executable instructions comprises receiving the configuration information from an authorized user terminal, storing the information in a data file, generating a certificate and applying it to the file to transform the file into a protected configuration data file, and deploying the protected configuration data file to the cloud-based service for querying by a service role of the cloud-based service.

In another aspect, a system as stated above instead includes instructions that execute a method for securely obtaining the configuration information from the cloud service including the steps of querying a protected configuration data file using the service role, using a generated certificate associated with the service role and the protected configuration data file to transform the protected configuration data file into an accessible protected configuration data file, and generating a secure entry for a secure output file log based at least in part upon the service role performing the query and the certificate.

In yet another aspect, a computer-implemented method for securely providing and obtaining configuration information using a cloud service is provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Referring now to the figures, aspects of this invention relate to providing additional security to cloud-based data, and more specifically, to securely providing and obtaining configuration data to prevent data leakage when a cloud-based application reads properties in a file containing configuration data. A computer system for securely providing and obtaining configuration information such as configuration data embodying aspects of the invention, generally referenced at 100, comprises configuration information stored on a database and a cloud service connected to the database via a data communication network. In an embodiment, authorized users are able to access configuration information via the cloud service.

Additionally, aspects of the present invention secure sensitive configuration information related to cloud-based resources. Securing this sensitive configuration information protects against compromising the data shared by the cloud service in the event that an unauthorized user obtains the physical hard drive on which the configuration information is stored, or gains access to the local network that is communicatively connected to the configuration information provided by the cloud service.

Figure 1A:
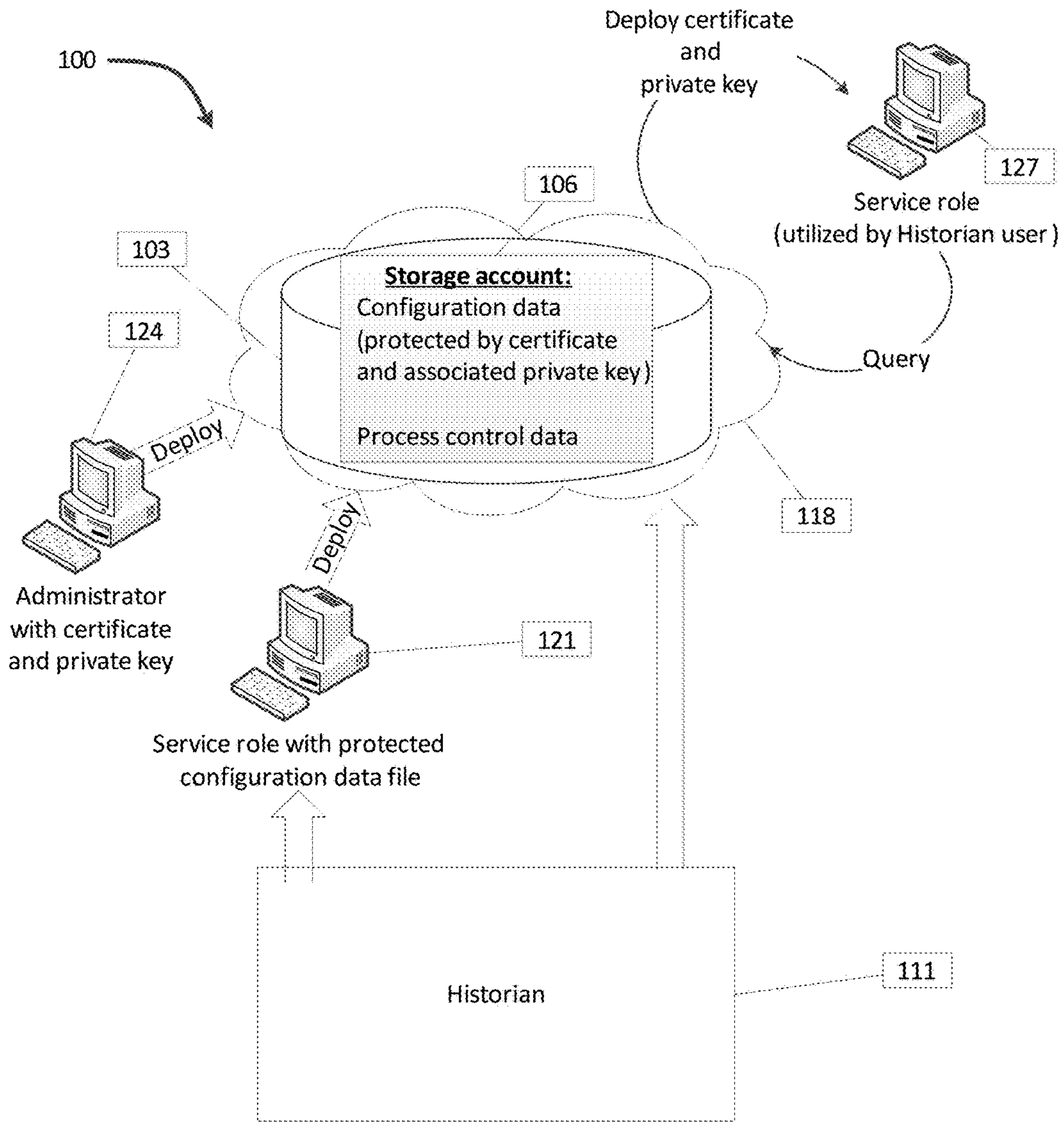
FIGS. 1A and 1B depict a computer system for securely providing and obtaining configuration data according to one embodiment of the present invention.

In FIG. 1A, a computer system 100 includes a cloud-based data store 103 storing a plurality of data sets. Although referred to as "process control data" in an embodiment, the plurality of data sets are stored through the use of a storage account 106, and comprise at least configuration data and process control data. The data sets stored through the use of a storage account 106 include at least time series data and configuration data, and are derived in part from a data acquisition process generally depicted in by FIG. 1B. For example, the storage account 106 comprises a series of hard disks. In an embodiment, storage account 106 is associated with a process historian 111 configured for storing large volume plant data and providing reporting, analysis, and visualization.

Figure 1B:
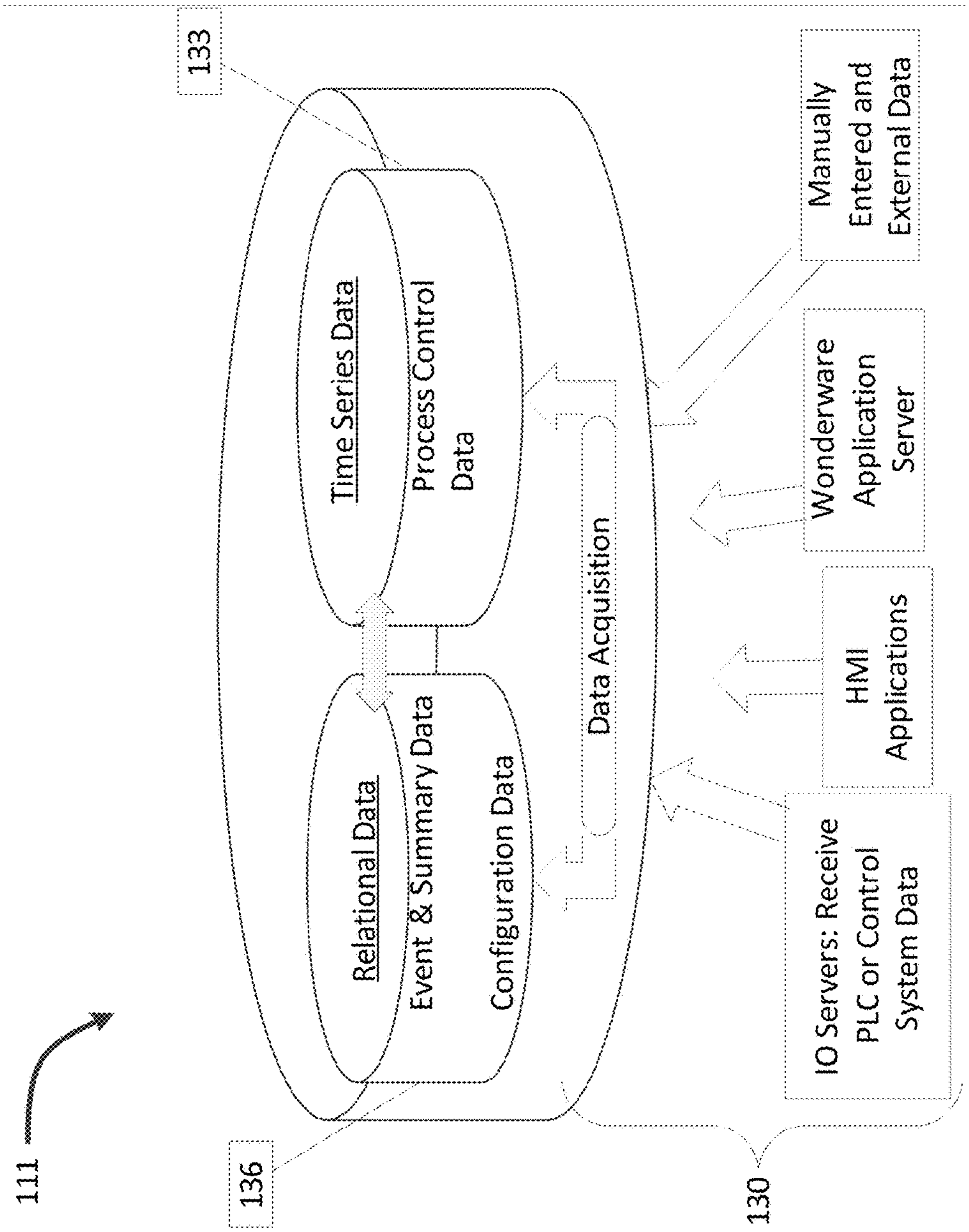

With reference to FIG. 1B, the historian 111 includes a time series database 133 and a relational database 136 according to an embodiment of the invention. In an embodiment, the time series database 133 and the relational database 136 each derive data from various sources during data acquisition 130, including at least one of: IO Servers, HMI applications, an application server, and manually entered and external data. The time series data is in part provided by process control data stored in the time series database 133. One having skill in the art understands time series data to describe data that is representative of historical plant process information such as, for example, a continuum of process flow values measured over a period of time. Configuration data is in part provided by the relational database 136. One having skill in the art understands configuration data to describe configuration settings for a cloud service 118 and individual roles utilized by the cloud service 118, as described above. The configuration data provided by the relational database 136 is used by a cloud service 118 associated with the cloud-based data store 103.

Those skilled in the art are familiar with a cloud service role (or "service role"), which is generally understood to be comprised of an application capable of running on the cloud-based computer system provider. In an embodiment, a cloud service role further includes a configuration. A cloud service role can have two types: a web role and a worker role. The web role is, for example, a service role capable of providing a dedicated Internet Information Services (IIS) web-server used for hosting front-end web applications. And the worker role is understood to be a service role capable of hosting applications that can run asynchronous, long-running or perpetual tasks independent of user interaction or input.

Referring again to FIG. 1A, system 100 further comprises one or one or more processors coupled to the cloud service 118 via a data communication network. In an embodiment, the processors are included in terminals such as a service role terminal 121, an administrator terminal 124, and a query terminal 127, which will be described in more detail herein. Further, memory devices are coupled to the one or more processors, the memory devices storing computer-executable instructions that, when executed by the one or more processors, cause the computer system to perform a method for securely providing the configuration data to the cloud service 118, which will also be described in more detail herein.

It is generally understood by those having ordinary skill in the art that the worker and web roles as described above require access to one or more storage accounts 106 administered by the cloud-based computer system provider that is managing the cloud service 118 in order to either access or store data. In an embodiment, the configuration data provides the required access through the use of parameters that comprise a name of a storage account 106, and an access key (see FIG. 2) related to the storage account 106. The access key according to embodiments of the invention allows a user to access the process data in the storage account 106. In addition, it is generally understood that the roles require access to other sensitive information such as user identification data and passwords in order to access other resources provided by the cloud-based computer system provider managing the cloud service 118. A non-limiting example of storing the name and access key related to a storage account 106 in a cloud service configuration file is displayed in Appendix A. The cloud service configuration file (designated by .cscfg) in this example provides configuration settings for the cloud service and individual roles, including the number of role instances.

Figure 2:
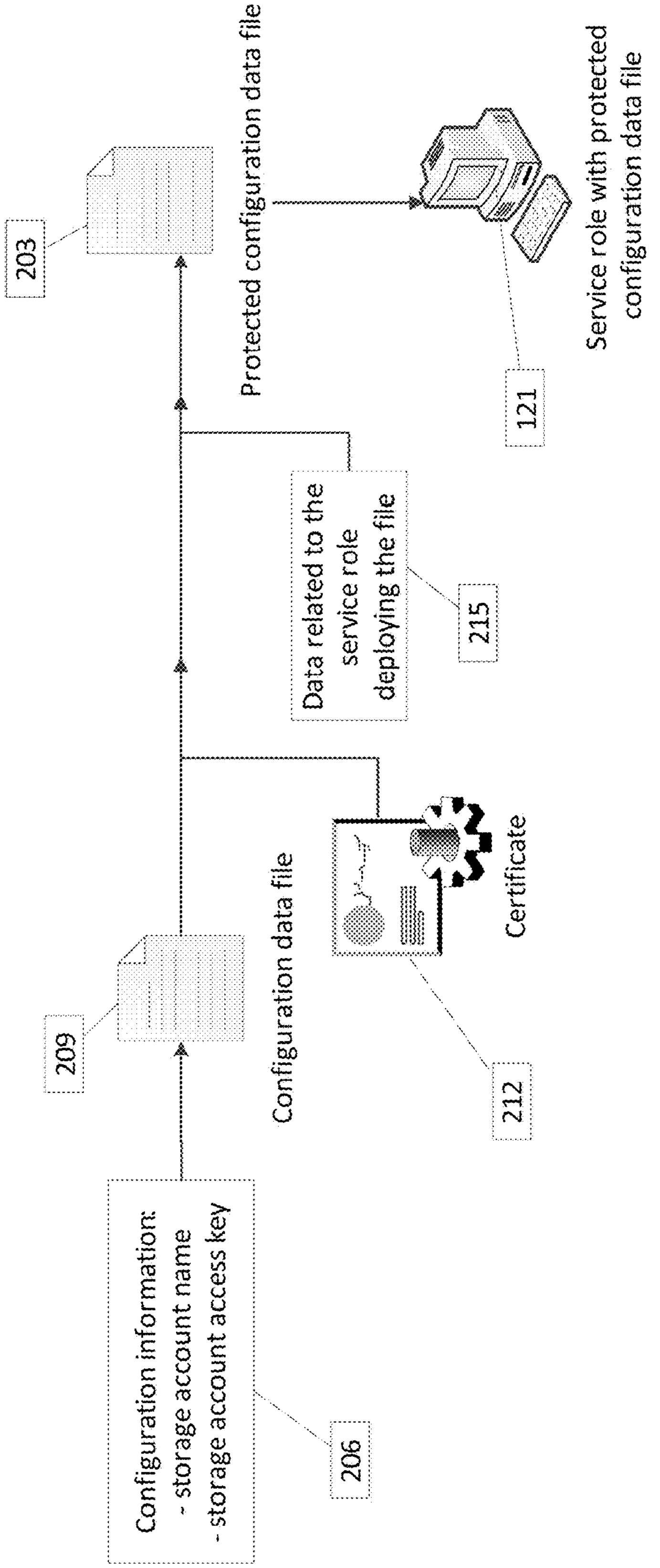
FIG. 2 depicts the generation of a protected configuration data file to be deployed by a service role according to one embodiment of the present invention.

FIG. 2 depicts the generation of a protected configuration data file 203 to be deployed by a service role according to one embodiment of the present invention. In an embodiment, the protected configuration data file 203 is generated using configuration information 206, also known as configuration data stored in a relational database 115. In an embodiment, the configuration information 206 is passed by the service role terminal 121 to the storage account 106 that is stored in the cloud-based data store 103. Advantageously, aspects of the present invention protect configuration details that are entered as configuration data provided by the relational database 115. The configuration data, also called configuration information 206, is loaded into a data file as plain text, and aspects of the present invention prevent the data from being seen by unauthorized users while the data sets storing time series data and configuration information 206 are backed up using the cloud-based data store 103 and the cloud service 118.

With further reference to FIG. 2, the generation of a protected configuration data file 203 comprises data that is to be entered into a configuration data file 209. This data comprises configuration information 206, also known as configuration data. The configuration information 206 comprises at least a storage account name and a storage account access key. In an embodiment a certificate 212, generated using, for example, a Public-Key encryption scheme as described above, is applied to the configuration data file 209. In an embodiment, service role data 215 related to the service role deploying the file is also applied to the configuration data file 209, resulting in the generation of a protected configuration data file 203. Advantageously, by providing the capability of deploying a protected configuration data file 203 through the application of Public-Key encryption, unauthorized users are prevented from unnecessarily having access to private keys, and the likelihood of compromising configuration information 206 is reduced.

Figure 3:
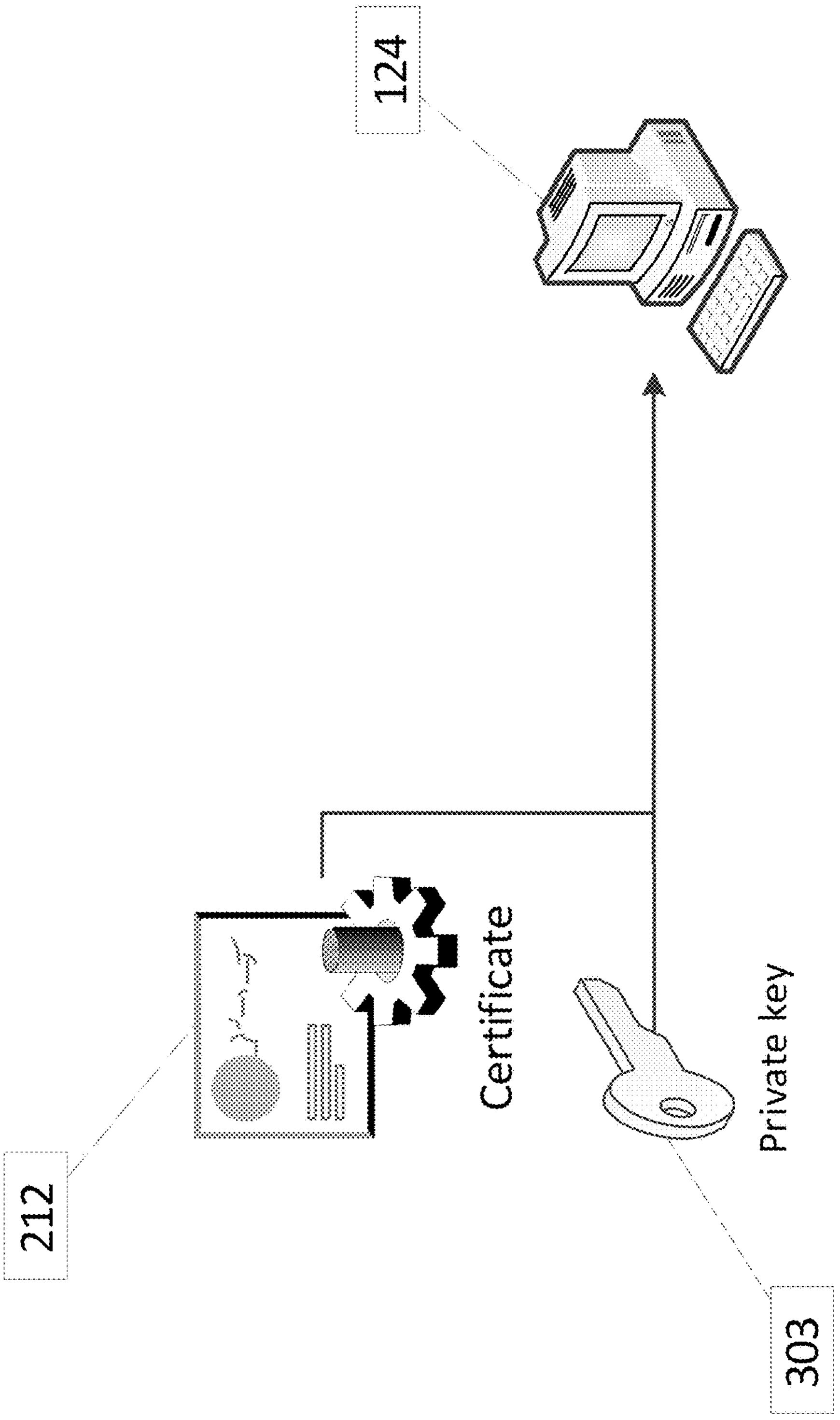
FIG. 3 depicts the deployment of a generated certificate and private key according to one embodiment of the present invention.

FIG. 3 depicts the deployment of a generated certificate 212 and private key 303 according to one embodiment of the present invention. A certificate 212 and a private key 303 associated with the certificate 212 are combined at a service role with appropriate authorization, such as a service role accessed at an administrator terminal 124. In this non-limiting example, the service role is configured to deploy the private key 303 and the certificate 212 to the cloud service 118. In a further embodiment, the cloud service 118 hosts the service role. In yet another embodiment, the service role uses a controlled and audited mechanism to deploy the private key 303 and the certificate 212. In an embodiment, the controlled and audited mechanism is in part provided by the cloud-based computer system provider, and in part provided by a department tasked with managing the installation, deployment, and/or configuration of a cloud-based application to a network.

In a further embodiment, the private key 303 and certificate 212 are deployed to the cloud service 118 that will host the service role. In yet another embodiment, the private key 303 and certificate 212 are deployed via a coding mechanism that is distinct from the coding mechanism that utilizes the private key 303 and certificate 212. Advantageously, providing distinct coding mechanisms in the manner described lowers the risk of unnecessarily exposing the certificate 212 and private key 303 to administrators and developers. Additionally, the private key 303 and certificate 212 are uploaded in an encrypted archive file format by accessing the cloud-based computer system provider. In an embodiment, the private key 303 and certificate 212 are uploaded using PKCS12 (PFX) file format. In a non-limiting example, the uploaded files are password protected, with the password being specified during the upload process. Using the manner previously described, the controlled and audited mechanism results in an upload of the private key 303 and the certificate 212 to the cloud-based data store 103. In an embodiment, the department tasked with managing the installation, deployment, and/or configuration of a cloud-based application to a network restricts access to the private key 303 and certificate 212 to authorized personnel. In a further embodiment, the department's internal processes govern access to the private key 303.

In an embodiment, the protected configuration data file 203 comprises the encrypted configuration values as well as a thumbprint of the certificate 212 as specified in a service configuration file. A non-limiting example of the result of such a process is displayed in Appendix C. In an embodiment, the thumbprint uniquely identifies the certificate 212. In a further embodiment, the process resulting in the encoded data including the encrypted values being uploaded to the cloud based service 118 as a protected configuration data file 203 involves the use of a tool that only needs a certificate 212 for the encoding and uploading process, and not a private key 303 associated with the certificate 212. Advantageously, the tool provides for the deployment of cloud-based resources to the network without the need for an associated private key 303, thereby allowing the private key 303 to be tightly controlled. In an embodiment, the user points to the thumbprint of the certificate 212 and clicks on an "encrypt" button to begin an encryption process. In a further embodiment, the thumbprint of the certificate 212 is provided by an out-of-band communication, as is understood by one having ordinary skill in the art. Advantageously, the tool is specifically designed for users who are unfamiliar with encryption processes.

In an embodiment, the protected configuration data file 203 additionally contains an identifier pertaining to the type of certificate 212 used to encrypt the file. In this manner, an unauthorized user who has accessed the configuration data, such as by removing the physical drive for example, is not able to access the configuration information 206 encrypted on the drive. However, an authorized user is able to view the decrypted data, and thus is able to view the identifier pertaining to the type of certificate 212 used to encrypt the file.

Figure 4:
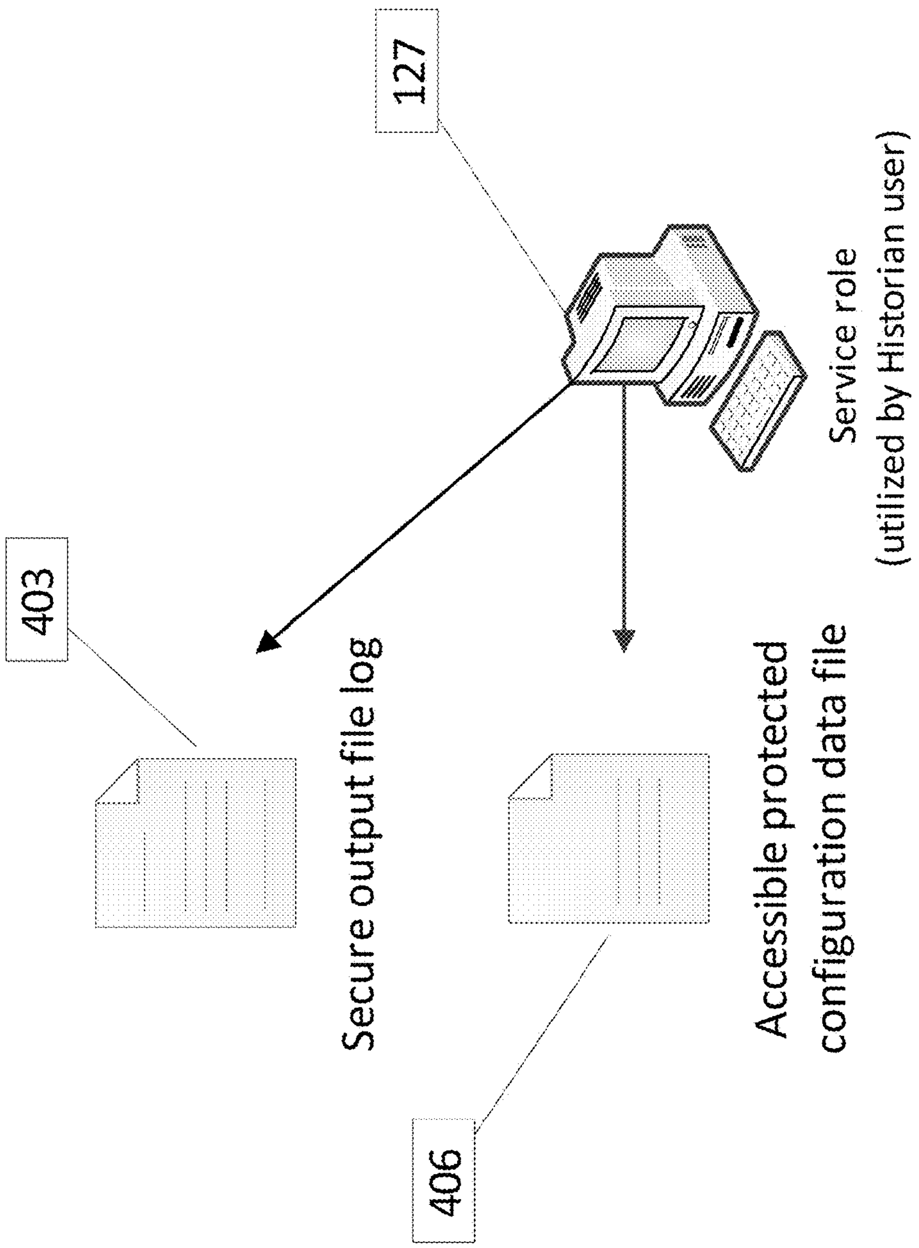
FIG. 4 depicts the outputs resulting from reading configuration information properties in accordance with one embodiment of the present invention.

FIG. 4 depicts exemplary outputs resulting from reading configuration information 206 properties in accordance with one embodiment of the present invention. In this instance, a service role such as the service role accessed by the query terminal 127 accesses configuration information 206 contained in a configuration data file 209 stored in a storage account 106. In a further embodiment, software components administered by the cloud service 118 output details related to the service role query into output file logs. The output file logs comprise, for example, secure output file logs 403 that result from querying the protected configuration data file 203 that is generated by applying the certificate 212 to the configuration data file 209 as previously described with reference to FIG. 2. In a further embodiment, the output file log results from the additional application of service role data 215 related to the service role deploying the file as previously described. A non-limiting example of such a secure output file log 403 is displayed in Appendix D. It is to be understood that the secure output file log 403 is presented in an encrypted form to the user in an embodiment, and is presented in a decrypted form if the user demonstrates appropriate authorization. Appropriate authorization is demonstrated through, for example, the application by the user of a private key 303, as will be further described below.

In an embodiment, a user of historization software utilizes the service role accessed, for example, by a query terminal 127. In a further embodiment, the historization software provides the capability of combining a proprietary high speed data acquisition and storage system with a Microsoft SQL server backend for enhanced data retrieval capabilities. Details that are output to the secure output file log 403 as a result of the service role querying configuration information 206 contained in the configuration data file 209 are protected by, for example, performing encoding operations on the data. In a further embodiment, the details are protected by encoding the data using certificate based encryption (CBE) on the data as defined above. Certificate based encryption (CBE) is generally understood to refer to a Public-Key encryption scheme using PKCS7 (http://tools.ietf.org/html/rfc2315). The messages are encrypted using 3DES. No signing is done since the requirement is to protect the message from prying eyes and not non-repudiation.

Protecting the details in this manner provides for various levels of security over the configuration information 206. Advantageously, various levels of security allow for users that are authorized to manage less-secure tasks, such as the operations department tasked to manage the deployment of a cloud-based application to a network, to be prevented from accessing configuration information 206 encrypted in the secure output file log 303 as well as configuration information 206 in the accessible protected configuration data file 306. It is advantageous to prevent such users to access such configuration information 206 to prevent the users tasked with managing deployment of the application from managing the application itself, which increases the possibility of unnecessarily compromising the configuration information 206

In an embodiment, as a result of the encoding and uploading process, the details that are output into a log file are output in an encoded form when a service role is deployed and reads the configuration data. An authorized service role has access to, for example, a private key 303 associated with the certificate 212, which allows the authorized service role to retrieve and decode the encoded output. In a further embodiment, the private key 303 is uploaded to the cloud service 118 by an authorized user with access to the private key 303, such as an administrator. In an additional embodiment, the private key 303 need only be uploaded a single time to provide access to the cloud service 118 via a service role associated with the private key 303. In yet another embodiment, access to by the application (or "service role") to the private key 303 is automatic once the role is deployed.

Advantageously, the above-described process allows users that are not authorized to access the private key 303, such as users tasked with managing the deployment of a service role to be authorized to deploy service roles, because access to the private key 303 is not necessary in order to deploy roles. Further, even in the event that the details that are output into the log file are compromised as described above, without access to the associated private key 303, a user is unable to decode the details, thus protecting the configuration information 206 from being compromised. A non-limiting example of an encrypted log entry in a secure output file log 403 is displayed in Appendix D.

Figure 5:
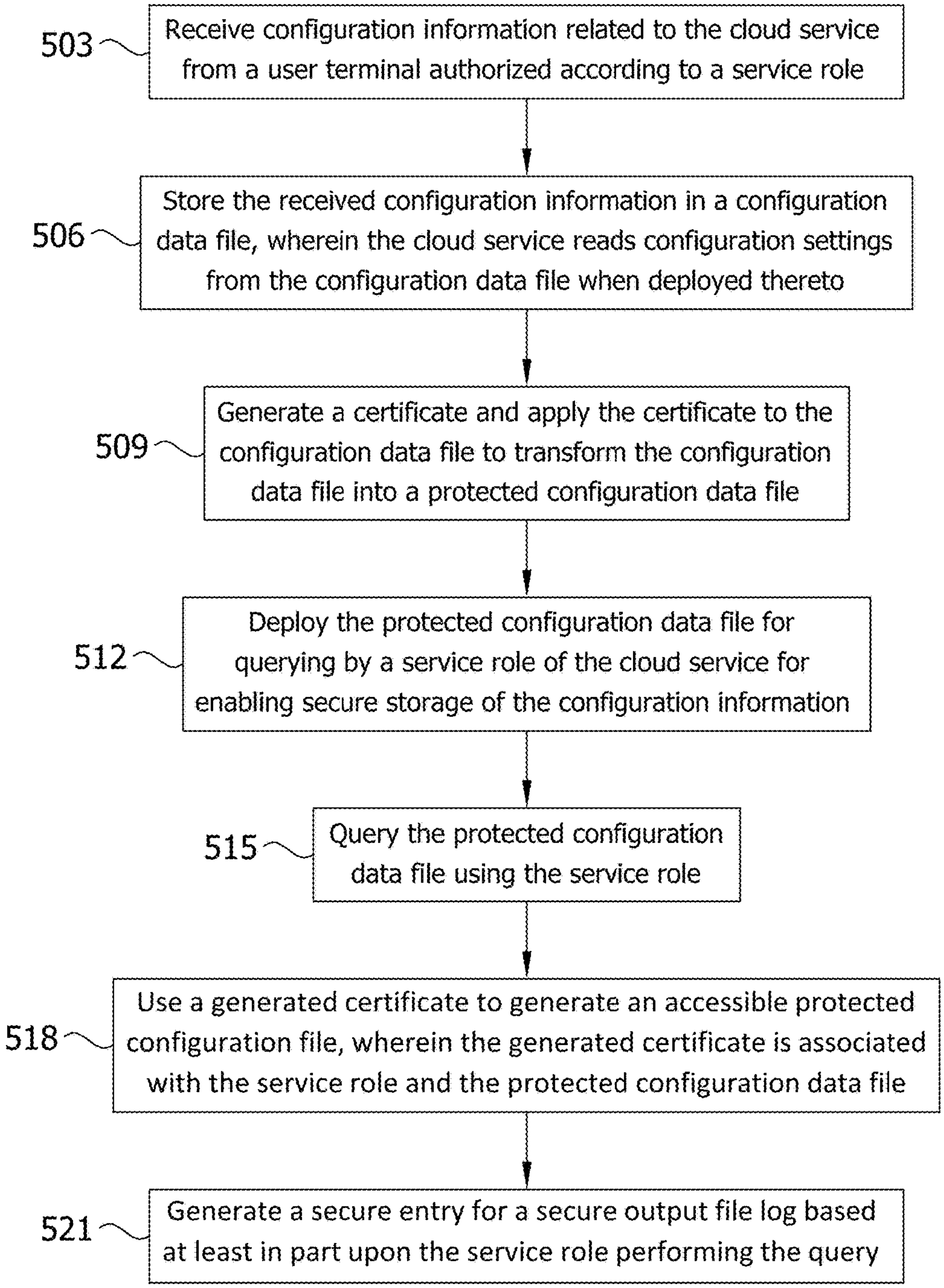
FIG. 5 is an exemplary flow diagram illustrating a method for securely providing and obtaining configuration information using a cloud service in accordance with one embodiment of the present invention.

FIG. 5 depicts a method for securely providing and obtaining configuration information 206 using a cloud service in accordance with one embodiment of the present invention. The process begins at 503, where a user terminal such as a service role terminal 121 that is authorized according to a service role receives configuration information 206 related to the cloud service 118. At 506, the received configuration information 206 is stored in a configuration data file 209, and the cloud service 118 reads configuration settings from the configuration data file 209 when the cloud service 118 is deployed thereto, such as through the operation of a query by a service role terminal 127, in one non-limiting example. In an embodiment, the configuration data file 209 further comprises data related to configuration settings for the cloud service 118 and configuration settings for the individual roles, including the number of role instances for the individual roles.

The process continues at 509, where a certificate 212 is generated and applied to the configuration data file 209 to generate a protected configuration data file 203. In an embodiment, service role data 215 related to the service role deploying the file is applied to the configuration data file 209 along with the certificate 212. In another embodiment, a private key 303 associated with the certificate 212 is additionally generated. At 512, the protected configuration data file 203 is deployed for querying by a service role of the cloud service 118 for enabling secure storage of the configuration information 206.

The process depicted in FIG. 5 continues at 515, where the protected configuration data file 203 is queried using the service role. At 518, the generated certificate 212 is used to generate an accessible protected configuration file 306, wherein the generated certificate 212 is associated with the service role and the protected configuration data file 203. In an embodiment, generating a certificate 212 further comprises applying service role data 215 to the configuration data file 209. In another embodiment, the protected configuration data file 203 further comprises data pertaining to the certificate 212 applied to generate the protected configuration data file 203 and data pertaining to a thumbprint of the certificate 212. In yet another embodiment, the generated certificate 212 used to generate a protected configuration data file 203 is further associated with a private key 303.

The illustrated process concludes at 521, where a secure entry for a secure output file log 403 is generated based at least in part upon the service role performing the query. In an embodiment, the secure entry for the secure output file log 403 is further generated based upon the certificate 212. Generating an entry comprises, for example, an entry for an output file log based at least in part upon the service role performing the query and the private key 303. In an additional embodiment, the method further comprises generating a private key 303 associated with the certificate 212, and deploying the private key 303 for querying by the service role for accessing the plurality of data sets. And in a further embodiment, the service role deploying the protected configuration data file is distinct from the service role querying the protected configuration data file, such as, in one non limiting example, as shown in FIG. 1, where the service role terminal 121 deploying the protected configuration data file 203 is distinct from the query terminal 127 querying the storage account 106 containing the configuration information 206.

It is to be understood that restricting the number of users that have access to resources such as stored data and applications enhances the security of the resources managed by the cloud-based computer system, in part by providing various levels of security over the configuration information 206 contained in a configuration data file 209. More specifically, access to the certificate 212 is provided to a user authorized to manage the deployment of configuration information read by a cloud-based application. However, access to the certificate does not necessarily provide access to the configuration information 206 because decoding the configuration information 206, in an embodiment, requires the use of the private key 303. In another embodiment, the user must have additional knowledge of exactly what configuration information 206 to use that is contained in the configuration data file 209, providing an additional layer of security. And, in an embodiment, the user must have access to the environment itself, including the capability of accessing the physical hard disks directly, or the capability of logging into the network communicatively connected to the physical hard disks, in order to access the configuration information 206. In the manner described above, the three layers of protection provide improved security over the configuration data file 209, because all three layers are required for access to the configuration information 206. Without access to all of the various levels of protection, a user is not authorized to access the configuration information 206. By requiring various levels of protection over configuration information 206 as described above, security over the information is increased.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles “a,” “an,” “the,” and “said” are intended to mean that there are one or more of the elements. The terms “comprising,” “including,” and “having” are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

APPENDIX A

Name and access key of a storage account within a service configuration file

<ServiceConfiguration xmlns :xsd=“http:/ /www .w3 .org/2001/XMLSchema ” xmlns
:xsi =“http ://www .w3 .org/ 2001/XMLSchema-
instance ” serviceName=“AzureHistorian” osFamily=“3” osVersion=“*” schem aVersion= “2013-
1 0.2.2 ” xmlns= “http://schemas.microsoft.com/ServiceHosting/2008/10/Service
Configuration”>
<Role name= “ClientAccessPoi nt”>
<ConfigurationSettings>
<Setting name= “Diagnostics.ConnectionString” value= “DefaultEndpoints
Protocol=https;AccountName=ryans;AccountKey=MWRyH 4SPuc
eMKo/U834UV j nq mSygignuAc /+Ej+pNapX0R0aPcROw4Hf8pS7E+Qufl0nikaK
SB2x30chsXd74Q==“ / >
<Setting name=“Historian.ConfigurationStore ” value= “Def aultEndpoints
Protocol=https;AccountName=ryans; AccountKey=MWRyH4S
PuceMKo/U834UVjnqmSygignuAc /+E j+pNapX0R0aPcROw4Hf8pS7E+Qufl
0nikaK SB2x3OchsXd74Q==“ />

Appendix B: Log file output resulting from a service role query of a configuration file 00001587 852.66583252 (3676] Getting “Diagnostics.ConnectionString” from ServiceRuntime: PASS (DefaultEndpointsProtocol=https; AccountName=ryan s;AccountKey=MWRyH4SPuceMKo/U83 4UVjnqmSygignuAc/+Ej+pNapXOROaPcROw4Hf8pS7E+Qufl OnikaKSB2x30chsXd74Q==)

APPENDIX C

Result of uploading encoded data to the cloud

<ServiceConfiguration xmlns=http://www.w3.org/2001/XMLSchema-instance xmlns:
xsd=“http://www.w3.org/2001/XMLSchema” serviceName=“AzureHistorian” osFamily=“3”
osVersion=“*” schemaVersion=“2014-01.2.3”

APPENDIX C-continued

Result of uploading encoded data to the cloud

```
xmlns="http://schemas.microsoft.com/ServiceHosting/2008/10/ServiceConfiguration">
        <Role name="ClientAccessPoint">
                <ConfigurationSettings>
                        <Setting name="Diagnostics.ConnectionString"
value="__CBE__V1__MIIByQYJKoZIhvcNAQcDoIIBujCCAbYCAQAxgfEwge4CAQAwVzBJMRMwEQY
KCZImiZPyLGQBGRYDY29tMRQwEgYKCZImiZPyLGQBGRYEY29ycDEcMBoGA1UEAxMTSW52ZW5
zeXNJc3N1aW5nQ0EwMglKHOgklQAAAAiagzANBgkqhkiG9w0BAQEFAASBgBZoNKkUPtbBkM68
w5xZQ2dw9LBBQdhhkzsce/7ubS7RoGoG2QkjtZ2XEi9xJOO+dJGFxhgFw3Cr/62DI6kslH94MsNZ2r
Qcjm2FbUxfYf8y3h2uiOyE3CpXVaeMjAROHoFaJnxFRDDJSa7oi4pa12sa50o+WXb7P2IIN+Vp82TX
MIG8BgkqhkiG9w0BBwEwFAYIKoZIhvcNAwcECH1/qcK6arZcglGYAToxlvqxiHaWOVrEWG5TeiMb
1pLmCgXut0qHH7sofy49zfEnPvCRbyctyYMI2fgfJPILtJAsZ2Z/iUcXVZTZudMQSGHG4ZhhFelvWvN
C5iB78J6GHAuCvgBT5VonABK7Qvl2vMmLnLhuVGxi2O2LXLzm1CpO3w8NZQMFDGgspjTByrffGV
+5ISn2vzLHtYLQp3q5zBiTp2M="/>
        <Setting name="Historian.ConfigurationStore"
value="__CBE__V1__MIIByQYJKoZIhvcNAQcDoIIBujCCAbYCAQAxgfEwge4CAQAwVzBJMRMwEQY
KCZImiZPyLGQBGRYDY29tMRQwEgYKCZImiZPyLGQBGRYEY29ycDEcMBoGA1UEAxMTSW52ZW5
zeXNJc3N1aW5nQ0EwMglKHOgklQAAAAiagzANBgkqhkiG9w0BAQEFAASBgBZoNKkUPtbBkM68
w5xZQ2dw9LBBQdhhkzsce/7ubS7RoGoG2QkjtZ2XEi9xJOO+dJGFxhgFw3Cr/62DI6kslH94MsNZ2r
Qcjm2FbUxfYf8y3h2uiOyE3CpXVaeMjAROHoFaJnxFRDDJSa7oi4pa12sa50o+WXb7P2IIN+Vp82TX
MIG8BgkqhkiG9w0BBwEwFAYIKoZIhvcNAwcECH1/qcK6arZcglGYAToxlvqxiHaWOVrEWG5TeiMb
1pLmCgXut0qHH7sofy49zfEnPvCRbyctyYMI2fgfJPILtJAsZ2Z/iUcXVZTZudMQSGHG4ZhhFelvWvN
C5iB78J6GHAuCvgBT5VonABK7Qvl2vMmLnLhuVGxi2O2LXLzm1CpO3w8NZQMFDGgspjTByrffGV
+5ISn2vzLHtYLQp3q5zBiTp2M="/>
        <Setting name="Historian.NamedPipes.UserName"
value/>="__CBE__V1__MIIBPwYJKoZlhvcNAQcDoIIBMDCCASwCAQAxgfEwge4CAQAwVzBJMRM
wEQYKCZImiZPyLGQBGRYDY29tMRQwEgYKCZImiZPyLGQBGRYEY29ycDEcMBoGA1UEAxMTSW5
2ZW5zeXNJc3N1aW5nQ0EwMglKHOgklQAAAAiagzANBgkqhkiG9w0BAQEFAASBgFfMyC6+6igg
WEeM6TKUzXeGArKnfM+adZ/LNizmxzbdjlVkZVP2GKAN5s+p0x8cq6+Af8cnlo5wjVglOpaRvkO6S
dv0miUbgcfl9lq4CmkVGAmKnFnGg7qe3co8jbTbS3J3P9hp8c1etOR9fnx2FHcAQ/YDenQMlz+tPa
8scQDvMDMGCSqGSIb3DQEHATAUBggqhkiG9w0DBwQltyB78bM296eAEJE5DRS2eeBdPbqKKaS
DY7M="/>
        <Setting name="Historian.NamedPipes.Password"
value="__CBE__V1__MIIBPwYJKoZlhvcNAQcDoIIBMDCCASwCAQAxgfEwge4CAQAwVzBJMRMwE
QYKCZImiZPyLGQBGRYDY29tMRQwEgYKCZImiZPyLGQBGRYEY29ycDEcMBoGA1UEAxMTSW52Z
W5zeXNJc3N1aW5nQ0EwMglKHOgk1QAAAAiagzANBgkqhkiG9w0BAQEFAASBgCuyMQjjGeAH5
ou/p2OIpiAFNfs14ajfiEopqMs1ou+vxRCC/gx8T+w5g5wL/z27HKQ6KU7Y/NX9brOV/gQhG1kQT3
Ky8pMoAPZkVZAz8jW9RPT/MAyUSGgg9US7iXvLRzMbeYiH7gdO7+5X5ISohj2PZ+IZrGp5KrQix93
L0IWcMDMGCSqGSIb3DQEHATAUBggqhkiG9w0DBwQIJ7vrnjqyVD6AElo5kSMflEtoTGizzP1Fyv0
="/>
        <Setting name="CBE.Thumbprint"
value="6E97496A220DC18DD413176E9909AF1F2319CC1A"/>
        </ConfigurationSettings>
        <Instances count="1"/>
        <Certificates>
                <Certificate name="SSL"
thumbprint="6E97496A220DC18DD413176E9909AF1F2319CC1A"
thumbprintAlgorithm="sha1"/>
                <Certificate name="CBE"
thumbprint="6E97496A220DC18DD413176E9909AF1F2319CC1A"
thumbprintAlgorithm="sha1"/>
                <Certificate
name="Microsoft.WindowsAzure.Plugins.RemoteAccess.PasswordEncryption"
thumbprint="6E97496A220DC18DD413176E9909AF1F2319CC1A"
thumbprintAlgorithm="sha1"/>
                </Certificates>
                </Role>
```

APPENDIX D

Encrypted log entry

```
00001587      852.66583252 [3676] Getting "Diagnostics.ConnectionString" from
ServiceRuntime: PASS
(__CBE__V1__MIIByQYJKoZlhvcNAQcDoIIBujCCAbYCAQAxgfEwge4CAQAwVzBJMRMwEQYKCZImi
ZPyLGQBGRYDY29tMRQwEgYKCZImiZPyLGQBGRYEY29ycDEcMBoGA1UEAxMTSW52ZW5zeXNJc
3N1aW5nQ0EwMglKHOgklQAAAAiagzANBgkqhkiG9w0BAQEFAASBgBZoNKkUPtbBkM68w5xZQ
2dw9LBBQdhhkzsce/7ubS7RoGoG2QkjtZ2XEi9xJOO+dJGFxhgFw3Cr/62DI6kslH94MsNZ2rQcjm2
FbUxfY18y3h2uiOyE3CpXVaeMjAROHoFaJnxFRDDJSa7oi4pa12sa50o+WXb7P2IIN+Vp82TXMIG8
BgkqhkiG9w0BBwEwFAYIKoZIhvcNAwcECH1/qcK6arZcglGYAToxlvqxiHaW0VrEWG5TeiMb1pLm
CgXut0qHH7sofy49zfEnPvCRbyctyYMI2fgfJPILtJAsZ2Z/iUcXVZTZudMQSGHG4ZhhFelvWvNC5iB7
8J6GHAuCvgBT5VonABK7Qvl2vMmLnLhuVGxi202LXLzm1CpO3w8NZQMFDGgspjTByrffGV+5ISn
2vzLHtYLQp3q5zBiTp2M=).
```

APPENDIX D-continued

| Encrypted log entry |
| --- |
| 00001588 852.66668701 [3676] Getting "CBE.Thumbprint" from ServiceRuntime: PASS (6E97496A220DC18DD413176E9909AF1F2319CC1A) |

What is claimed is:

1. A computer system comprising:

a cloud-based data store comprising a plurality of data sets in at least one storage account thereof, at least one of the data sets storing time series data representative of historical plant process information and at least one other of the data sets storing configuration information, wherein the configuration information is configured for use by a cloud service associated with the data store, and wherein the configuration information comprises at least an access key related to the storage account; and a service role terminal, comprising:

one or more processors coupled to the cloud service and a process historian via a data communication network, wherein the service role terminal is coupled between the cloud service and the process historian; and a memory device coupled to the one or more processors, said memory device storing computer-executable instructions that, when executed by the one or more processors, cause the service role terminal to perform a method for securely providing the configuration information to the cloud service, wherein the method comprises:

receiving, by the service role terminal, the configuration information related to the cloud service downloaded from the process historian when the service role terminal is authorized for said receiving according to a deploy service role of the cloud service;

storing, by the service role terminal, the received configuration information in a configuration data file;

applying, by the service role terminal, a public certificate without a private key to the configuration data file to transform the configuration data file into a protected configuration data file; and uploading, by the service role terminal, the protected configuration data file to the cloud service, wherein configuration settings of the uploaded protected configuration data file are available for reading by the cloud service via the public certificate while the configuration data file is protected, and wherein the uploaded protected configuration data file is available for querying by a query service role of the cloud service while the configuration data file is protected.

2. The computer system of claim 1, wherein the configuration information further comprises a name of the storage account.

3. The computer system of claim 1, wherein the deploy service role and the query service role each further comprises at least one of a web role providing a dedicated internet information services (IIS) web server used for hosting front-end web applications and a worker role providing applications capable of running asynchronous tasks that are independent of user interaction or input.

4. The computer system of claim 1, wherein the method further comprises utilizing the cloud service via the deploy service role including at least one of: storing data related to monitoring process control variables, accessing data related to process control variables, accessing user identification data, and accessing user password data.

5. The computer system of claim 1, wherein the configuration data file further comprises data related to configuration settings for the cloud service and configuration settings for individual service roles of the cloud service, including a number of role instances for the individual service roles.

6. The computer system of claim 1, wherein:

the protected configuration data file further comprises data pertaining to the certificate applied to generate the protected configuration data file and data pertaining to a thumbprint of the certificate.

7. The computer system of claim 1, further comprising an administrator terminal, comprising:

one or more processors coupled to the cloud service via the data communication network; and a memory device coupled to the one or more processors, said memory device storing computer-executable instructions that, when executed by the one or more processors, cause the administrator terminal to perform a method for generating and deploying the certificate and a private key, wherein the method comprises:

generating the certificate by applying data related to the deploy service role to the configuration data file;

generating a private key associated with the certificate; and deploying the certificate and the private key to the cloud service.

8. A computer-implemented method for securely providing and obtaining configuration information using a cloud service, wherein the method comprises:

receiving, by a service role terminal, configuration information related to the cloud service downloaded from a process historian, said service role terminal communicatively coupled between the cloud service and the process historian, said receiving authorized according to a deploy service role of the cloud service, and said configuration information comprising at least an access key related to a storage account of the cloud service;

storing, by the service role terminal, the received configuration information in a configuration data file;

applying, by the service role terminal, a certificate generated by public-key encryption to the configuration data file to transform the configuration data file into a protected configuration data file;

uploading, by the service role terminal, the protected configuration data file to the cloud service, wherein the protected configuration data file is available for querying by a query service role of the cloud service while the configuration data file is protected upon said uploading;

receiving, by the cloud service, a query for the protected configuration data file from a query service role of the cloud service;

using, by the cloud service, the certificate to generate an accessible protected configuration file, wherein the certificate is associated with the query service role and the protected configuration data file;

generating, by the service role terminal, a private key associated with the certificate; and generating, by the cloud service, an entry comprising a secure entry for a secure output file log based at least in part upon the query service role performing the query and the private key.

9. The computer-implemented method of claim 8, wherein the configuration information further comprises a name of the storage account.

10. The computer-implemented method of claim 8, wherein the deploy service role and the query service role each further comprises at least one of a web role providing a dedicated internet information services (IIS) web server used for hosting front-end web applications and a worker role providing applications capable of running asynchronous tasks that are independent of user interaction or input.

11. The computer-implemented method of claim 8, further comprising utilizing the cloud service via the deploy service role including at least one of:

storing data related to monitoring process control variables, accessing data related to process control variables, accessing user identification data, and accessing user password data.

12. The computer-implemented method of claim 8, wherein the configuration data file further comprises data related to configuration settings for the cloud service and configuration settings for individual service roles of the cloud service, including a number of role instances for the individual service roles.

13. The computer-implemented method of claim 8, wherein the deploy service role is distinct from the query service role.

* * * * *